(12) United States Patent
Branch

(10) Patent No.: US 9,103,849 B2
(45) Date of Patent: Aug. 11, 2015

(54) IMPACT INDICATOR

(75) Inventor: Clinton A. Branch, Jacksboro, TX (US)

(73) Assignee: ShockWatch, Inc., Dallas, TX (US)

( * ) Notice: Subject to any disclaimer, the term of this patent is extended or adjusted under 35 U.S.C. 154(b) by 453 days.

(21) Appl. No.: 13/483,817

(22) Filed: May 30, 2012

(65) Prior Publication Data
US 2012/0312071 A1 Dec. 13, 2012

Related U.S. Application Data

(60) Provisional application No. 61/495,400, filed on Jun. 10, 2011.

(51) Int. Cl.
G01N 3/08 (2006.01)
G01P 15/06 (2006.01)
G01P 15/04 (2006.01)

(52) U.S. Cl.
CPC ................ G01P 15/06 (2013.01); G01P 15/04 (2013.01)

(58) Field of Classification Search
CPC .................................. G01P 15/06; G01P 15/04
USPC ................ 73/12.01, 12.04, 12.06–12.07, 762
See application file for complete search history.

(56) References Cited

U.S. PATENT DOCUMENTS

| 2,674,221 | A | * | 4/1954 | Tinsley | 116/215 |
| 2,825,297 | A | | 3/1958 | Harrison | |
| 3,620,677 | A | * | 11/1971 | Ayers | 422/423 |
| 3,623,449 | A | | 11/1971 | Knutson | |
| 3,909,568 | A | | 9/1975 | Greenhug | |
| 4,068,613 | A | | 1/1978 | Rubey | |
| 4,125,085 | A | | 11/1978 | Rubey | |
| 4,177,751 | A | | 12/1979 | Rubey | |
| 4,219,708 | A | | 8/1980 | Rubey | |
| 4,239,014 | A | | 12/1980 | Rubey | |
| 4,688,244 | A | | 8/1987 | Hannon et al. | |
| 5,027,105 | A | | 6/1991 | Dailey et al. | |
| 5,051,725 | A | | 9/1991 | Caccitolo | |
| 5,153,561 | A | | 10/1992 | Johnson | |
| 5,347,274 | A | | 9/1994 | Hassett | |
| 6,301,718 | B1 | * | 10/2001 | Rigal | 2/411 |
| 6,367,408 | B1 | * | 4/2002 | Gu | 116/203 |
| 6,685,094 | B2 | | 2/2004 | Cameron | |
| 6,698,272 | B1 | * | 3/2004 | Almirante | 73/12.01 |
| 7,119,759 | B2 | | 10/2006 | Zehner et al. | |
| 7,353,770 | B2 | * | 4/2008 | Sanguinetti | 116/200 |
| 7,509,835 | B2 | | 3/2009 | Beck | |
| 8,539,843 | B2 | * | 9/2013 | Inns et al. | 73/862.57 |
| 2011/0070963 | A1 | | 3/2011 | Fedorochko et al. | |

OTHER PUBLICATIONS

Haga Takeski (Sumitomo Electric Ind. Ltd.), JP-2006-300768, Feb. 11, 2006, JPO, total 21 pages.*
International Search Report and Written Opinion; PCT Application No. PCT/US2012/040007; Dec. 26, 2012.

* cited by examiner

Primary Examiner — Max Noori
(74) Attorney, Agent, or Firm — James L. Baudino

(57) ABSTRACT

A device and technique for impact detection includes a tube having a first fluid and a second fluid disposed therein, wherein a viscosity of the second fluid is greater than a viscosity of the first fluid, and wherein, responsive to a predetermined level of impact received by the impact indicator, at least a portion of the first fluid mixes into the second fluid to create a change in color of the second fluid to provide a visual indication of the received impact.

27 Claims, 5 Drawing Sheets

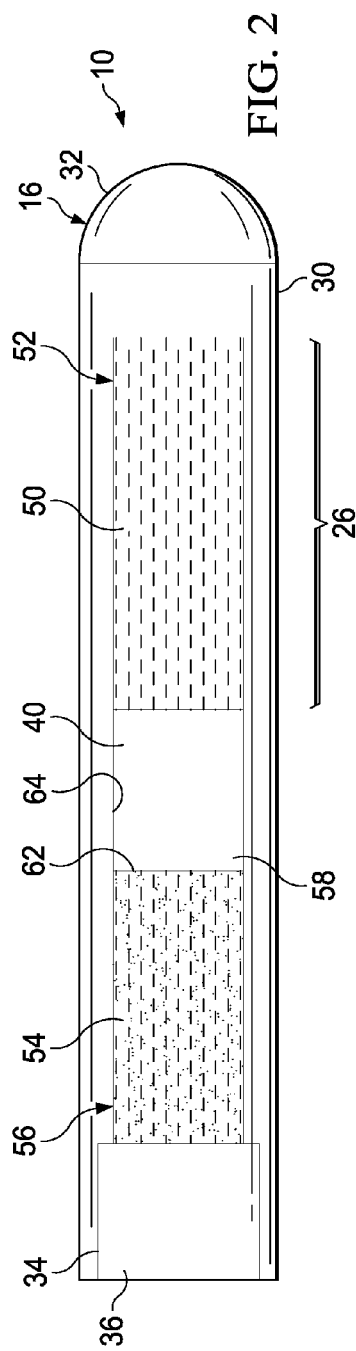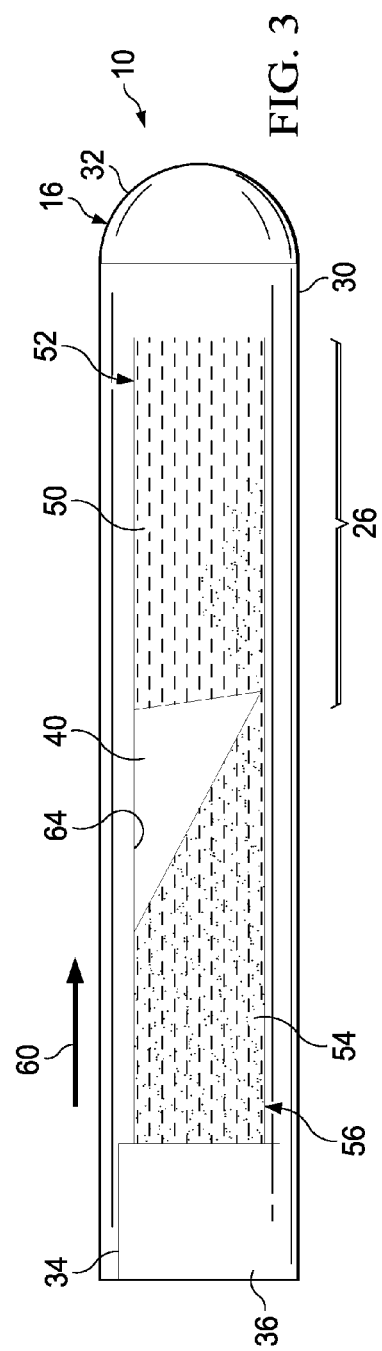

ated in FIGS. 1A and 1B, impact indicator 10 is configured to detect and indicate impact or acceleration events relative to indicator 10. For example, referring to FIG. 1A, impact indicator 10 comprises a clip assembly 12 that is affixed to a container 14 for detecting and indicating impact or acceleration events relative to container 14. As described above, clip assembly 12 may be affixed to an exterior surface of container 14 using, for example, adhesive materials, permanent or temporary fasteners, or a variety of different types of attachment devices or mechanisms. However, it should also be understood that impact indicator 10 may also be located and/or disposed within container 14. Clip assembly 12 is configured to support a tube assembly 16. In some embodiments, clip assembly 12 is configured to support tube assembly 16 while enabling an indicating portion of tube assembly 16 to be visible for visually indicating whether an acceleration event has been experienced/detected. However, it should be understood that clip assembly 12 may be otherwise configured. It should be further understood that in some embodiments, tube assembly 16 may be used independently of clip assembly 12. For example, tube assembly 16 may be
IMPACT INDICATOR

BACKGROUND

During manufacturing, storage or transit, many types of objects need to be monitored due to the sensitivity or fragility of the objects. For example, some types of objects may be susceptible to damage if dropped or a significant impact is received. Thus, for quality control purposes and/or the general monitoring of transportation conditions, it is desirable to determine and/or verify the environmental conditions to which the object has been exposed.

BRIEF SUMMARY

According to one aspect of the present disclosure, a device and technique for impact detection and indication is disclosed. The impact indicator includes a tube having a first fluid and a second fluid disposed therein, wherein a viscosity of the second fluid is greater than a viscosity of the first fluid, and wherein, responsive to a predetermined level of impact received by the impact indicator, at least a portion of the first fluid mixes into the second fluid to create a change in color of the second fluid to provide a visual indication of the received impact.

According to another embodiment of the present disclosure, an impact indicator includes a tube; a first fluid disposed within the tube; a second fluid disposed within the tube, and a third fluid disposed within the tube, wherein the third fluid is disposed between and separates the first fluid from the second fluid in a non-activated state of the impact indicator. In response to a predetermined level of impact received by the impact indicator, at least a portion of the first fluid contacts the second fluid to create a change in color of the second fluid to provide a visual indication of the received impact According to another embodiment of the present disclosure, a method for manufacturing an impact indicator includes: disposing, within a tube, a first fluid; disposing, within the tube, a second fluid spaced apart from the first fluid by a third fluid, the second fluid selected having a viscosity greater than a viscosity of the first fluid. Responsive to a predetermined level of impact received by the impact indicator, at least a portion of the first fluid contacts the second fluid to create a change in color of the second fluid to provide a visual indication of the received impact.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which:

FIG. 2 is a diagram illustrating a tube assembly of the impact indicator of FIGS. 1A and 1B in a non-activated state according to the present disclosure;

FIG. 3 is a diagram illustrating the tube assembly of FIG. 3 in response to exposure to an acceleration event in accordance with the present disclosure;

DETAILED DESCRIPTION

Embodiments of the present disclosure provide a device and technique for impact detection and indication. According to one embodiment, an impact indicator includes a tube having a first fluid and a second fluid disposed therein, wherein a viscosity of the second fluid is greater than a viscosity of the first fluid, and wherein, responsive to a predetermined level of impact received by the impact indicator, at least a portion of the first fluid contacts the second fluid to create a change in color of the second fluid to provide a visual indication of the received impact. Embodiments of the present disclosure enable impact and/or acceleration event detection and indication utilizing a passive, small/compact indicator. Impact activation levels may be obtained over a variety of acceleration levels experienced for certain time durations by selecting a certain internal cavity size of the tube and/or certain viscosity levels of fluids contained with the tube.

Figure 1A:
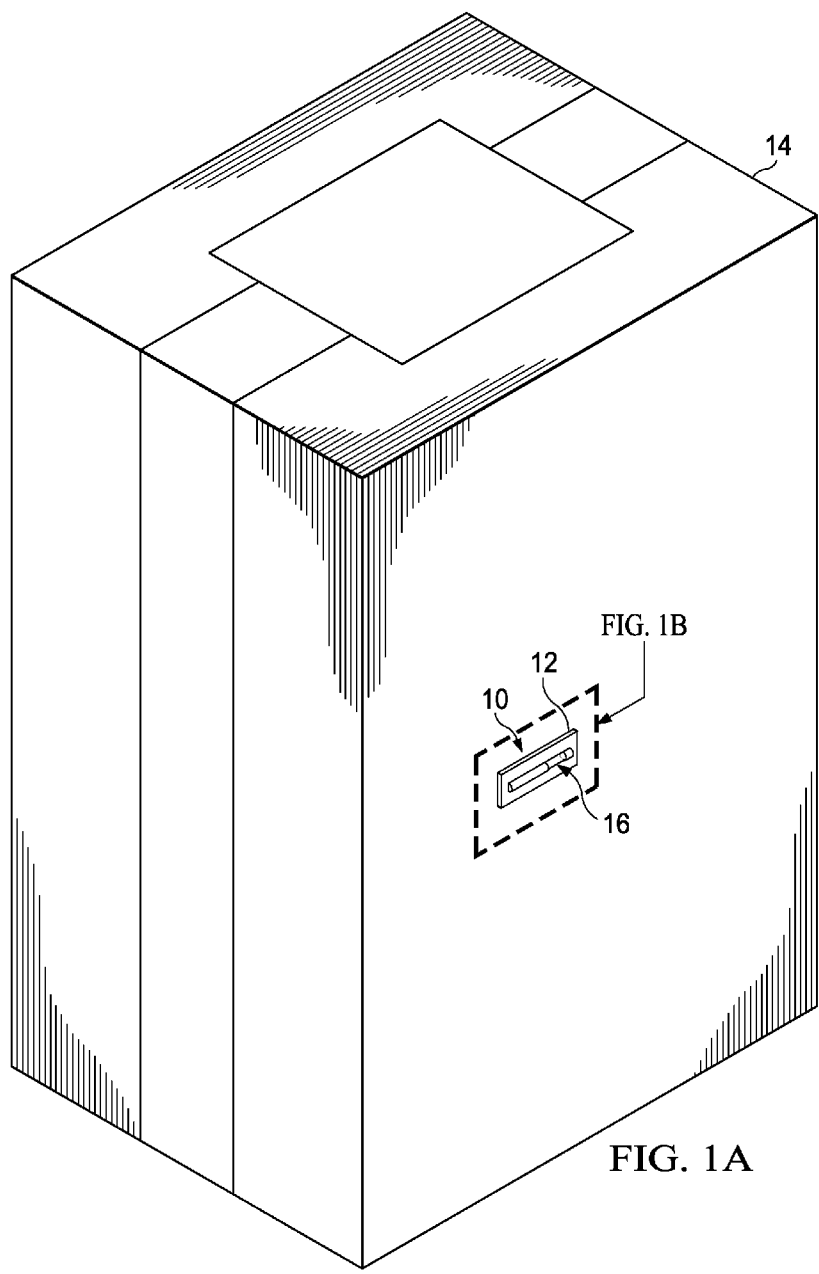
FIG. 1A is a diagram illustrating an application of embodiment of an impact indicator according to the present disclosure.
Figure 1B:
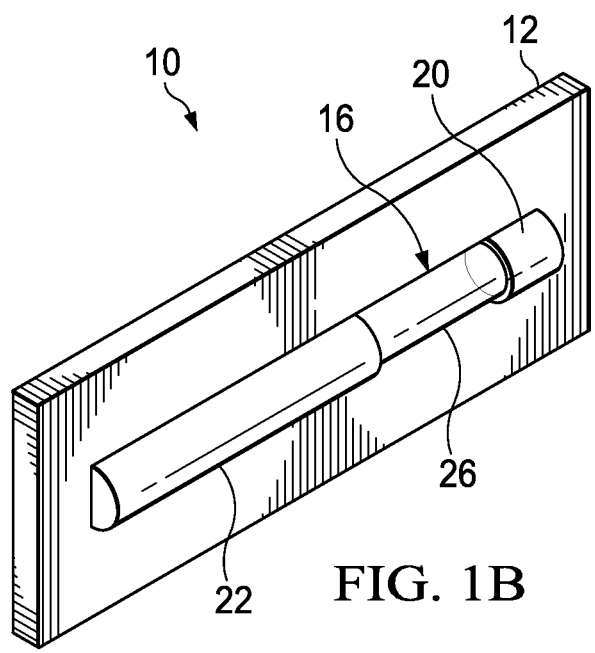
FIG. 1B is a diagram illustrating an enlarged view of the impact indicator of FIG. 1A.

With reference now to the Figures and in particular with reference to FIGS. 1A and 1B, exemplary diagrams of an impact indicator 10 are provided in which illustrative embodiments of the present disclosure may be implemented. In FIGS. 1A and 1B, impact indicator 10 is a portable device configured to be affixed to or disposed within a transport container containing an object of which impact and/or acceleration events associated therewith are to be monitored. Embodiments of impact indicator 10 monitor whether an object has been exposed to an impact or some level of an acceleration event during manufacturing, storage and/or transport of the object. In some embodiments, impact indicator 10 may be affixed to a transport container using, for example, adhesive materials, permanent or temporary fasteners, or a variety of different types of attachment devices. The transport container may include a container in which a monitored object is loosely placed or may comprise a container of the monitored object itself. It should be appreciated that FIGS. 1A and 1B are only exemplary and are not intended to assert or imply any limitation with regard to the environments in which different embodiments may be implemented.

FIG. 1A is a diagram illustrating an embodiment of impact indicator 10 used in connection with a transport container, and FIG. 1B is a diagram illustrating an enlarged view of a portion of impact indicator of FIG. 1A. In the embodiment illustr incorporated directly into container 14, located within an internal or external pocket or holding device of container 14, placed loosely within container 14, or otherwise used without clip assembly 12.

As illustrated in FIG. 1B, clip assembly 12 includes support portion 20 and 22 that support opposite ends of tube assembly 16. Support portions 20 and 22 are configured to enable an indicating portion 26 of tube assembly 16 to be visible to enable a user or viewer to visually detect whether an acceleration event has been experienced by and/or detected by impact indicator 10. As will be described in further detail below, indicating portion 26 of tube assembly 16 may provide a color indication of impact detection/indication (e.g., changing from one color to a different color). It should be understood that clip assembly 12 may be otherwise configured to facilitate attachment of tube assembly 16 to container 14 and providing a visual indication of impact detection.

FIG. 2 is a diagram illustrating an embodiment of impact indicator 10 without clip assembly 12. In the illustrated embodiment, tube assembly 12 comprises a tube 30 having a closed end 32 and an open end 34. A plug 36 is insertable into open end 34 to seal tube 30. However, it should be understood that in some embodiments, tube 30 may be configured with openings at both ends such that a plug 36 may be inserted at each end to seal an interior portion of tube 30. In the embodiment illustrated in FIG. 2, tube 30 comprises a hollow tube 30 having an internal diameter or cavity 40 for containing fluids therein. For example, in the illustrated embodiment, tube 30 comprises a cylindrical tube having an internal cavity 40 for containing fluids therein. However, the shape of tube 30 may be otherwise configured/selected. In some embodiments, tube 30 comprises a single tube-like structure formed from a clear, transparent, translucent and/or semi-opaque material to enable visibility of fluids contained within tube 30 (e.g., at least with respect to indicating portion 26). However, it should be understood that in some embodiments, tube 30 may be formed from multiple components attached together to form tube 30 (e.g., multiple components attached together such that at least one of the components comprises a clear, transparent, translucent and/or semi-opaque portion or window to enable visibility of a fluid contained within the structure). Tube 30 may also be formed from an opaque material but having at least a portion thereof (e.g., a window) to enable visibility of at least a portion of a fluid located within tube 30 (e.g., at least with respect to indicating portion 26). Plug 36 may comprise an epoxy plug/seal or other type of device/component for sealing end 34 and retaining fluids located within internal cavity 40 of tube 30.

In the embodiment illustrated in FIG. 2, a fluid 50 is located near or at an end 52 of internal cavity 40, and a fluid 54 is located near or at an opposite end 56 of internal cavity 40. Fluids 50 and 54 are spaced apart from each other within cavity 40 in an inactivated state of impact indicator 10 by a separating fluid 58. In some embodiments, separating fluid 58 comprises a gas such as, but not limited to, atmospheric air, and fluids 50 and 54 are liquids; however, other types of fluids (gases or liquids) may be used for fluids 50, 54 and 58. In some embodiments, fluid 54 comprises a coloring fluid or dyed fluid, and fluid 50 comprises a clear, non-colored, or different color than a color of fluid 54 that is soluble or miscible with fluid 54. In some embodiments, fluid 54 may include a colored dye such that the colored dye discolors and/or otherwise causes a color change to fluid 50 in response to contact of fluid 54 with fluid 50. It should be understood that other types of coloring mechanisms may be used to provide a visual indication of impact detection. For example, in some embodiments, fluids 50 and 54 may be selected such that a chemical reaction resulting from contact of fluid 54 with fluid 50 causes a change in color or discoloration of fluid 50. As will be described in further detail below, in response to tube assembly 16 experiencing or being subject to a predetermined level of impact or acceleration event, a droplet or portion of fluid 54 lands on and/or contacts fluid 50, thereby mixing with fluid 50 and causing a change in color or discoloration of fluid 50 to visually indicate impact detection.

In some embodiments, fluid 50 is selected having a viscosity greater than a viscosity of fluid 54 such that a droplet or portion of fluid 54 is released and/or migrates toward fluid 50 in response to a predetermined level of impact or acceleration event instead of fluid 50 migrating or being released toward fluid 54. For example, FIG. 3 is a diagram illustrating impact indicator 10 of FIG. 2 in response to experiencing or being subject to an impact or acceleration event (e.g., in direction 60 or at an angle thereto having a directional vector component in direction 60). Referring to FIGS. 2 and 3, in response to a droplet or portion of fluid 54 contacting fluid 50, the droplet of fluid 54 begins mixing with fluid 50 and causes a color change or discoloration of fluid 50, thereby providing a visual indication of impact detection. The impact sensitivity of impact indicator 10 (i.e., the level of impact or acceleration causing fluid 54 to be released and land on or contact fluid 50) may be controlled at least by the bore diameter of internal cavity 40. As the bore size/diameter of cavity 40 is reduced, a higher magnitude of acceleration is generally needed to rupture a meniscus 62 of fluid 54 in contact with an interior surface 64 of tube 30 and release fluid 54. For example, there are generally two factors that influence fluid 54's response to acceleration—viscosity and surface tension. Viscosity influences a fluid's ability to quickly deform and change shape. Surface tension influences a fluid's affinity and adhesion to itself or an external surface. There is generally a finite range over which the viscosity of a fluid can be varied and significantly affect the activation or impact sensitivity. For example, in some embodiments, this range may be approximately between twenty centistokes and eighty centistokes, depending on the internal bore diameter of cavity 40. However, it should be understood that other viscosities or viscosity ranges may be utilized based on a selected bore size of cavity 40. In some embodiments of the present disclosure, fluid 54 is selected such that higher accelerations are required to rupture meniscus 62 while using a bore size of cavity 40 that promotes ease of manufacture. In some embodiments, the target bore size of cavity 40 is between 0.025" and 0.085" to provide ease of manufacture and high yields; however, it should be understood that the target bore size of cavity 40 may be greater or smaller.

In some embodiments of the present disclosure, three classes of fluids may be utilized for fluid 54: a) synthetic hydraulic fluids; b) silicone oils; and/or c) polypropylene glycol. These fluids promote higher impact sensitivities. For example, synthetic hydraulic fluids were originally developed as a non-flammable alternative to oil-based hydraulic fluid. Synthetic hydraulic fluids are available in various controlled viscosities. Many synthetic hydraulic fluids have a very high viscosity index. Viscosity index is a number that characterizes how the viscosity of a fluid changes due to temperature changes. Viscosity index is calculated from the measured viscosity at 40° C. and 100° C. using ASTM Method D 2270. Synthetic hydraulic fluids are stable and have moderately low freezing points.

Silicone oils (polymerized siloxanes) are generally considered not to be silicone but rather silicon analogues of carbon based organic compounds, and can form (relatively) long and complex molecules based on silicon rather than carbon.

Chains are formed of alternating silicon-oxygen atoms ( . . . Si—O—Si—O—Si . . . ) or siloxane, rather than carbon atoms ( . . . C—C—C—C . . . ). Other species attach to the tetravalent silicon atoms, not to the divalent oxygen atoms which are fully committed to forming the siloxane chain. A typical example is polydimethylsiloxane, where two methyl groups attach to each silicon atom to form (H3C)[SiO(CH3) 2]nSi(CH3)3. The carbon analogue would be an alkane (e.g. dimethylpropane C5H12 or (H3C)[C(CH3)2](CH3)). Silicone oils have an extremely high viscosity index and are available in controlled viscosities. Silicone oils are very inert, stable and have very low freezing points.

Polypropylene glycol or polypropylene oxide is generally considered to be the polymer of propylene glycol. Chemically, polypropylene glycol is a polyether. The term polypropylene glycol or PPG is reserved for a low to medium range molar mass polymer when the nature of the end-group, which is usually a hydroxyl group, affect polymer properties. The term "oxide" is used for a high molar mass polymer when end-groups no longer affect polymer properties. Polypropylene glycol is available in various molecular weights, which in turn provides for various viscosities. Polypropylene glycol also has a very low freezing point, is easily colored, and has a moderate viscosity index.

Thus, in some embodiments of the present disclosure, synthetic hydraulic fluids, silicone oils, and/or polypropylene glycol may be selected in various controlled viscosities for fluid 54. Further, synthetic hydraulic fluids, silicone oils, and/or polypropylene glycol may also be blended to form fluid 54 having a precise desired viscosity. Thus, embodiments of the present disclosure enable the selection and/or use of different particular viscosity fluids that may be used with a single capillary tube bore size to provide a variety of different impact sensitivities for impact indicator 10. Thus, for example, in some embodiments, one capillary tube bore size for cavity 40 may be selected and/or used while changing the viscosity of fluid 54 to produce a variety of impact sensitivities for the one bore size, thereby reducing the number tube 30 bore sizes that need to be purchased/manufactured and also increasing the volume of the single bore size that may be purchased/manufactured (reducing the cost of material).

Thus, in operation, the bore size and/or viscosity of fluid 54 and/or fluid 50 are selected such that a predetermined level of impact or acceleration event is needed to effectuate a rupture of meniscus 62 relative to fluid 54 to cause a droplet and/or portion of fluid 54 to be released toward and contact fluid 50. For example, referring to FIGS. 2 and 3, because the viscosity of fluid 50 is greater than a viscosity of fluid 54, in response to a sufficient magnitude of an impact or acceleration event, meniscus 62 distorts and/or ruptures causing a droplet and/or portion of fluid 54 to be released or migrate toward fluid 50. In response to a droplet or portion of fluid 54 contacting fluid 50, fluid 54 causes a color change to fluid 50 to thereby provide a visual indication of impact detection. The spacing, separation and/or distance between fluids 50 and 54 in a non-activated state may also be selected corresponding to a desired impact sensitivity or activation of impact indicator 10. For example, depending on the bore size of cavity 40 and/or the viscosities of fluids 50 and/or 54, the amount of separation between fluids 50 and 54 by fluid 58 in a non-activated state may be selected to accommodate a droplet and/or portion of fluid 54 contacting fluid 50 in response to a predetermined level of impact or acceleration event.

In some embodiments (referring to FIGS. 1A, 1B and 2), portions of tube assembly 16 may be covered or hidden from view (e.g., by clip assembly 12) except for indicating portion 26. Thus, before activation, fluid 50 visible within indicating portion 26 may depict a clear fluid or a fluid of a particular color. However, in response to experiencing or being subject to a predetermined level of impact or acceleration event, fluid 54 causes a color change of fluid 50 such that the color change of fluid 50 is visible within indicating portion 26 to provide a visual indication of impact detection. For example, if fluid 54 is colored with a red dye and fluid 50 is initially a clear fluid in a non-activated state, the red dye of fluid 54 may mix into fluid 50 in response to impact detection, thereby causing fluid 50 to become colored red to visually indicate impact detection. As described above, indicating portion 26 may comprise an unmasked portion of tube 30 while remaining portions of tube 30 are masked such that indicating portion 26 comprises a window or viewing area for visual impact detection indication.

Thus, embodiments of the present disclosure enable a very small impact detection device to be manufactured and used with products that have very little unused space available for incorporating an impact detection device therein. For example, the general designs of handheld devices (e.g., mobile telephones, personal digital assistants, cameras, tablet or notebook computers, etc.) are such that there is very little unused space within the devices. The extremely small size of the impact indicator embodiments of the present disclosure enable a significant advantage when an internal mounting within the handheld device is used. Internal mountings are typically used where a review of the device occurs to determine warranty claims. The passive visual nature of the impact indicator embodiments of the present disclosure enable them to be used without any electrical integration, thus there are no electrical design actions required by the handheld manufacturers. Further, in some embodiments, tube assembly 16 may be mounted directly to internal structures of a handheld or other type of device. For example, in some embodiments, tube assembly 16 may be formed having masked portions adjacent to indicating portion 26 such that tube assembly 16 may be independently secured within a handheld or other type of electronic device (i.e., without clip assembly 12). In other embodiments, another type of clip assembly or attachment device may be used to secure tube assembly 16 within the device. Thus, during repair and/or evaluation of the handheld device, impact detection may be readily observed/detected by evaluating the color of indicating portion 26 of tube assembly 16 to determine whether the device may have been dropped or otherwise subjected to an impact or acceleration event.

Figure 4:
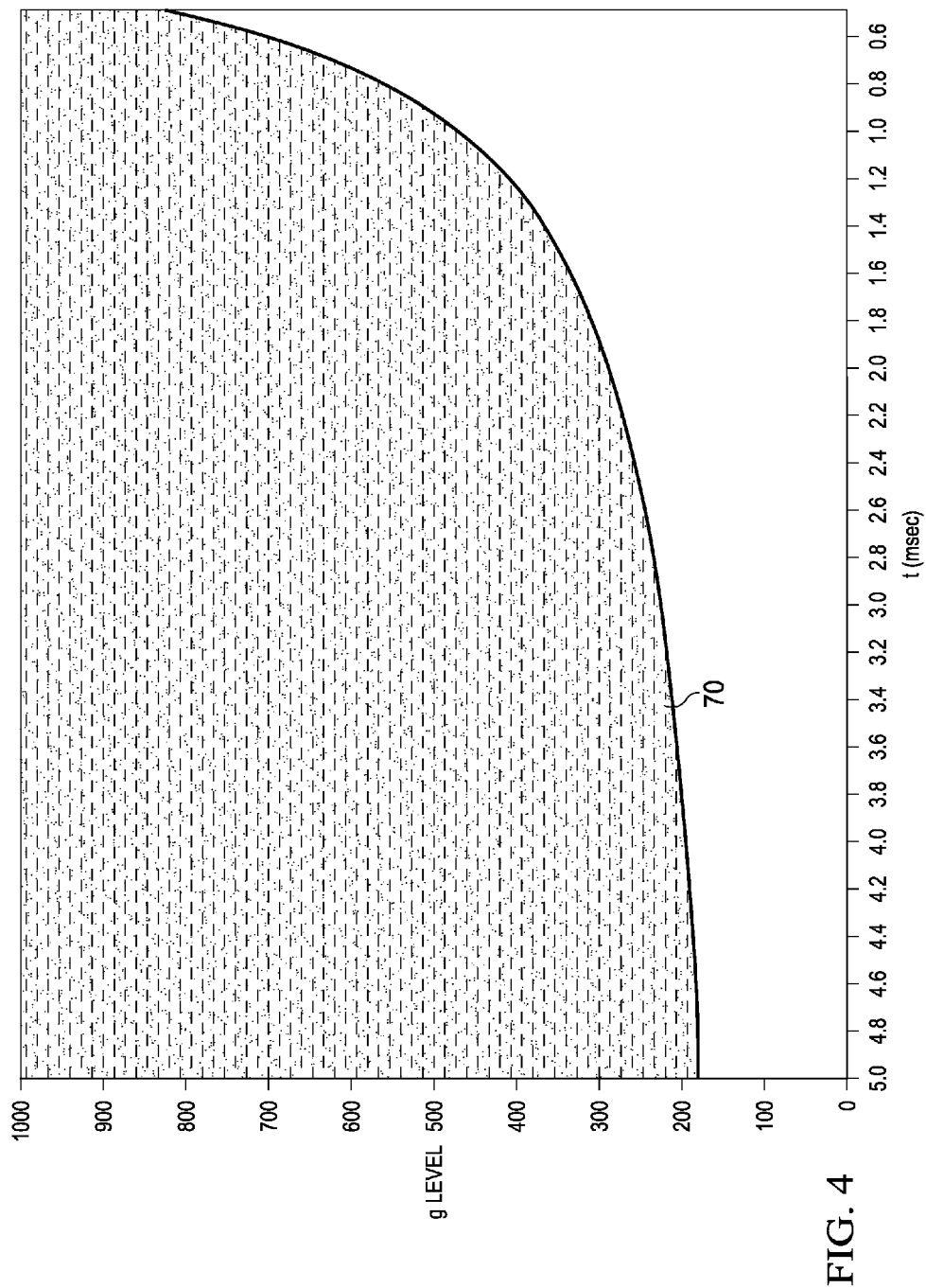
FIG. 4 is a diagram illustrating an impact activation zone corresponding to various embodiments of an impact indicator according to the present disclosure.

FIG. 4 is a diagram illustrating a target impact sensitivity zone for various embodiments of impact indicator 10 according to the present disclosure. FIG. 4 illustrates a graph depicting acceleration (g level) versus time (in milliseconds), where "g" represents the acceleration level due to gravity (e.g., 9.8 m/s$^2$). For many types of handheld electronic devices (or even other types of devices/components), relatively high acceleration levels are experienced over a relative short time period (e.g., several milliseconds). Such devices are generally manufactured to specifications which require the device to withstand certain high levels of acceleration experienced over a short time period (e.g., moderate disruption of operation) while acceleration levels above some threshold may result in inoperability of the device. Embodiments of the present disclosure enable a small, compact impact indicator that may be used with such electronic devices to determine whether the electronic device has been subjected to a level of impact/ acceleration exceeding some threshold such that may have contributed to an inoperable condition of the device.

Referring to FIG. 4, by reducing a bore size of cavity 40 of tube assembly 16 and selecting certain viscosities for fluid 54 and/or fluid 50, the impact sensitivity of impact indicator 10 may be configured to be within a desired impact sensitivity or activation zone, such as an impact sensitivity or activation zone 70 depicted in FIG. 4. For example, in some embodiments, a bore size of cavity 40 may be configured to be between 0.025" and 0.085" and a viscosity of fluid 54 may be selected to be between twenty centistokes and eighty centistokes. At such bore sizes of cavity 40 and viscosities of fluid 54, impact indicator 10 may be configured for an impact sensitivity or impact activation corresponding to the impact sensitivity zone 70 as illustrated in FIG. 4, thereby providing an impact indicator that is activated in response to high acceleration levels experienced over relatively short time periods. For example, by selecting a certain bore size of cavity 40 and/or a certain viscosity of fluid 54, an impact sensitivity or impact activation level for impact indicator 10 may be set for activating in response to at least a 400 g-force value experienced for a two millisecond time period, or in response to at least a 300 g-force value experienced for a time period between 1.6 milliseconds and 5 milliseconds. It should be understood that various impact sensitivity or activation levels may be configured for impact indicator 10 by adjusting a size of cavity 40, a viscosity of fluid 54 and/or fluid 50, and/or a size of separation between fluids 50 and 54 by fluid 58 to obtain impact sensitivity or activation levels within zone 70. It should also be understood that impact indicator 10 may also be configured to impact activation at g-levels/time periods outside those indicated by zone 70

Various methods may be employed to manufacture impact indicator 10. For example, in some embodiments, a syringe or other instrument may be used to first introduce or dispose fluid 50 within cavity 40 at end 52 of tube 30 from or through end 34. A syringe or other instrument may then be used to introduce or dispose fluid 54 within cavity 40 spaced apart from fluid 50 from or through end 34. Plug 36 may then be inserted into end 34 of tube 30 to seal or close cavity 40. In other embodiments, tube 30 may be open at each end such that fluids 50 and 54 may be introduced or disposed within cavity 40 from respective opposite ends of tube 30. Tube 30 may then be sealed (e.g., sealing cavity 40) by utilizing a plug at both ends of tube 30. It should be understood that various other methods may also be used to produce or manufacture impact indicator 10.

Figure 5:
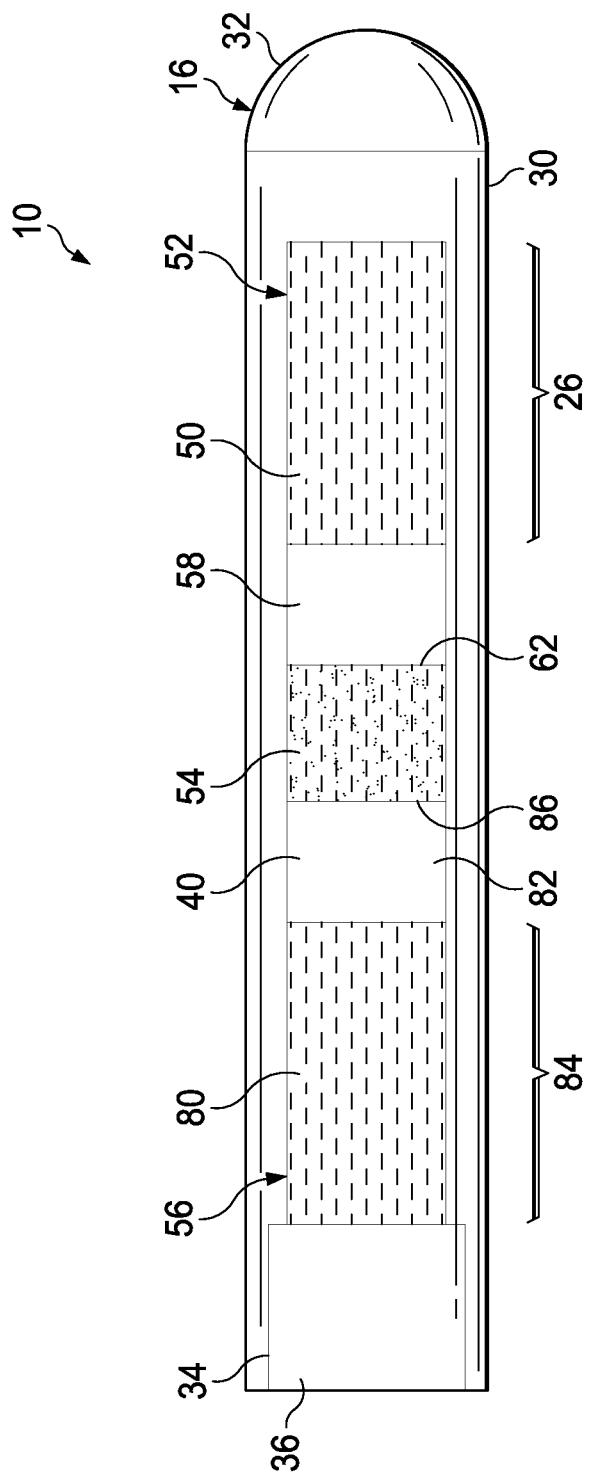
FIG. 5 is a diagram illustrating another embodiment of an impact indicator according to the present disclosure.

FIG. 5 is a diagram illustrating another embodiment of impact indicator 10 in accordance with the present disclosure. In the embodiment illustrated in FIG. 5, impact indicator 10 is depicted in a non-activated state. In FIG. 5, impact indicator 10 includes tube assembly 16 with fluid 50 located near or at end 52 of internal cavity 40 of tube 30. In the illustrated embodiment, a fluid 80 is located near or at an opposite end 56 of internal cavity 40. Fluid 80 may comprise the same type of fluid as fluid 50 or may comprise a different type of fluid. Fluid 54 is located within cavity 40 between fluids 50 and 80. Further, fluid 54 is spaced apart from fluid 50 and fluid 80 within cavity 40 in an inactivated state of impact indicator 10 by separating fluid 58 and a separating fluid 82, respectively. In some embodiments, separating fluids 58 and 82 comprise a gas such as, but not limited to, atmospheric air; however, other types of gases or fluids may be used. In some embodiments, fluid 54 comprises a coloring fluid or dyed fluid, and fluids 50 and/or 80 comprise a clear or other type of fluid that is soluble or miscible with fluid 54. In some embodiments, fluid 54 may include a colored dye such that the colored dye discolors and/or otherwise causes a color change to fluids 50 and 80 in response to contact of fluid 54 with either fluid 50 or 80. It should be understood that other types of coloring mechanisms may be used to provide a visual indication of impact detection. For example, in some embodiments, fluids 50, 54 and 80 may be selected such that a chemical reaction resulting from contact of fluid 54 with either fluid 50 or 80 causes a change in color or discoloration of respective fluid 50 or 80. As will be described in further detail below, in response to tube assembly 16 experiencing or being subject to a predetermined level of impact or acceleration event, a droplet or portion of fluid 54 lands on and/or contacts either fluid 50 or fluid 80 (e.g., depending on a direction of impact or acceleration event), thereby mixing with fluid 50 or fluid 80 and causing a change in color or discoloration of fluid 50 or fluid 80 to visually indicate impact detection.

In some embodiments, clip assembly 12 and/or tube assembly 16 may be formed to create indicating portion 26 relative to fluid 50 and another indicating portion 84 relative to fluid 80 such that portions of tube assembly 16 may be covered or hidden from view except for indicating portions 26 and 84. Thus, before activation, fluids 50 and 80 visible within respective indicating portions 26 and 84 may depict a clear fluid or a fluid of a particular color. However, in response to experiencing or being subject to a predetermined level of impact or acceleration event, fluid 54 causes a color change of fluid 50 or fluid 80 such that the color change of fluid 50 or fluid 80 is visible within a respective indicating portion 26 or 84 to provide a visual indication of impact detection. In some embodiments, fluids 50 and 80 are selected having a viscosity greater than a viscosity of fluid 54 such that a droplet or portion of fluid 54 is released and/or migrates toward either fluid 50 or fluid 80 in response to a predetermined level of impact or acceleration event (depending on impact or acceleration event direction) instead of fluid 50 or 80 migrating or being released toward fluid 54. Thus, in response to a sufficient magnitude of an impact or acceleration event, depending on a direction of such impact or acceleration event, meniscus 62 or a meniscus 86 of fluid 54 distorts and/or ruptures causing a droplet and/or portion of fluid 54 to be released or migrate toward fluid 50 or fluid 80. In response to a droplet or portion of fluid 54 contacting fluid 50 or fluid 80, fluid 54 causes a color change to respective fluid 50 or fluid 80 to thereby provide a visual indication of impact detection.

Thus, embodiments of the present disclosure enable impact and/or acceleration event detection utilizing a passive, small/compact indicator. Further, embodiments of the present disclosure enable impact and/or acceleration event detection over an increased range of acceleration event conditions (e.g., g-levels experienced over short time durations), thereby facilitating use of the indicator 10 with a variety of types of devices. Further, embodiments of the present disclosure provide omnidirectional impact detection and indication.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An impact indicator, comprising:
a tube having a first fluid and a second fluid disposed therein, wherein a viscosity of the second fluid is greater than a viscosity of the first fluid, and wherein, responsive to a predetermined level of an acceleration event received by the impact indicator, at least a portion of the first fluid mixes into the second fluid to create a change in color of the second fluid to provide a visual indication of the received acceleration event.

2. The impact indicator of claim 1, wherein the first fluid comprises a color different than a color of the second fluid in a non-activated state of the impact indicator, and wherein the second fluid is soluble with the first fluid.

3. The impact indicator of claim 1, further comprising a third fluid disposed between and separating the first fluid from the second fluid in a non-activated state of the impact indicator.

4. The impact indicator of claim 3, wherein the third fluid comprises a gas, and wherein the first and second fluids comprise liquids.

5. The impact indicator of claim 3, wherein an internal bore size of the tube and an amount of separation between the first and second fluids by the third fluid are selected to obtain a desired activation sensitivity for the predetermined level of the acceleration event.

6. The impact indicator of claim 3, wherein an internal bore size of the tube, an amount of separation between the first and second fluids by the third fluid, and the viscosity of the first fluid are selected to obtain a desired activation sensitivity for the predetermined level of the acceleration event.

7. The impact indicator of claim 1, wherein an internal bore size of the tube and the viscosity of the first fluid are selected to obtain a desired activation sensitivity for the predetermined level of the acceleration event.

8. The impact indicator of claim 1, wherein the first fluid comprises a synthetic hydraulic fluid.

9. The impact indicator of claim 1, wherein the first fluid comprises a silicone oil fluid.

10. The impact indicator of claim 1, wherein the first fluid comprises a propylene glycol fluid.

11. The impact indicator of claim 7, wherein the viscosity of the first fluid is between 20 and 80 centistokes.

12. The impact indicator of claim 11, wherein the internal bore size of the tube is between 0.025 and 0.085 inches.

13. The impact indicator of claim 7, wherein the internal bore size of the tube and the viscosity of the first fluid are selected to obtain a desired activation sensitivity of at least a 400 g-force value for a 2 millisecond time period.

14. The impact indicator of claim 7, wherein the internal bore size of the tube and the viscosity of the first fluid are selected to obtain a desired activation sensitivity of at least a 300 g-force value received for a time period between 1.6 milliseconds and 5 milliseconds.

15. An impact indicator, comprising:
a tube;
a first fluid disposed within the tube;
a second fluid disposed within the tube, and
a third fluid disposed within the tube, wherein the third fluid is disposed between and separates the first fluid from the second fluid in a non-activated state of the impact indicator, and wherein, responsive to a predetermined level of impact received by the impact indicator, at least a portion of the first fluid contacts the second fluid to create a change in color of the second fluid to provide a visual indication of the received impact.

16. The impact indicator of claim 15, wherein the first fluid comprises a color different than a color of the second fluid in a non-activated state of the impact indicator, and wherein the second fluid is soluble with the first fluid.

17. The impact indicator of claim 15, wherein an internal bore size of the tube and an amount of separation between the first and second fluids by the third fluid are selected to obtain a desired activation sensitivity for the predetermined level of impact.

18. The impact indicator of claim 15, wherein an internal bore size of the tube, an amount of separation between the first and second fluids by the third fluid, and a viscosity of the first fluid are selected to obtain a desired activation sensitivity for the predetermined level of impact.

19. The impact indicator of claim 15, wherein the first fluid comprises at least one of a synthetic hydraulic fluid, a silicone oil fluid and a propylene glycol fluid.

20. The impact indicator of claim 15, wherein the first and second fluids comprise a liquid, and wherein the third fluid comprises a gas.

21. The impact indicator of claim 15, wherein an internal bore size of the tube and a viscosity of the first fluid are selected to obtain a desired activation sensitivity for the predetermined level of impact.

22. A method for manufacturing an impact indicator, comprising:
disposing, within a tube, a first fluid;
disposing, within the tube, a second fluid spaced apart from the first fluid by a third fluid, the second fluid selected having a viscosity greater than a viscosity of the first fluid, and wherein, responsive to a predetermined level of impact received by the impact indicator, at least a portion of the first fluid contacts the second fluid to create a change in color of the second fluid to provide a visual indication of the received impact.

23. The method of claim 22, further comprising providing an internal bore size of the tube to obtain a desired impact sensitivity for the predetermined level of impact.

24. The method of claim 22, further comprising providing the first fluid comprising at least one of a synthetic hydraulic fluid, a silicone oil fluid and a propylene glycol fluid.

25. The method of claim 22, further comprising providing an internal bore size of the tube, an amount of separation between the first and second fluids by the third fluid, and the viscosity of the first fluid to obtain a desired activation sensitivity for the predetermined level of impact.

26. The method of claim 22, further comprising providing the first fluid having a color different than a color of the second fluid in a non-activated state of the impact indicator, and providing the first and second fluids where the second fluid is soluble with the first fluid.

27. The method of claim 22, further comprising selecting the first and second fluids as a liquid, and selecting the third fluid as a gas.

* * * * *